(12) United States Patent
Francisco

(10) Patent No.: US 9,813,754 B2
(45) Date of Patent: Nov. 7, 2017

(54) STREAMING AND RENDERING OF 3-DIMENSIONAL VIDEO BY INTERNET PROTOCOL STREAMS

(75) Inventor: Mark David Francisco, Millstone Township, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 13/613,262

(22) Filed: Sep. 13, 2012

(65) Prior Publication Data

US 2013/0002820 A1  Jan. 3, 2013

Related U.S. Application Data

(62) Division of application No. 12/755,382, filed on Apr. 6, 2010.

(51) Int. Cl.
| | |
|---|---|
| *H04N 19/59* | (2014.01) |
| *H04N 21/43* | (2011.01) |
| *H04N 13/00* | (2006.01) |
| *H04N 21/242* | (2011.01) |
| *H04N 19/597* | (2014.01) |

(52) U.S. Cl.
CPC ..... *H04N 21/4307* (2013.01); *H04N 13/0059* (2013.01); *H04N 19/597* (2014.11); *H04N 21/242* (2013.01)

(58) Field of Classification Search
USPC .......................................................... 348/51
See application file for complete search history.

(56) References Cited

U.S. PATENT DOCUMENTS

| | | | |
|---|---|---|---|
| 4,809,065 A |   | 2/1989 | Harris et al. |
| 5,264,964 A | * | 11/1993 | Faris .............................. 359/465 |
| 5,537,151 A | * | 7/1996 | Orr et al. ....................... 348/564 |

(Continued)

FOREIGN PATENT DOCUMENTS

| | | |
|---|---|---|
| CA | 2735591 | 4/2011 |
| CA | 2795694 | 10/2012 |

(Continued)

OTHER PUBLICATIONS

Partial European Search Report—EP11160925.1—dated Apr. 19, 2013.

(Continued)

*Primary Examiner* — Leron Beck
(74) *Attorney, Agent, or Firm* — Banner & Witcoff, Ltd.

(57) ABSTRACT

Transmitting and receiving 3D video content via an Internet protocol (IP) stream are described. 3D video content may be transmitted in a single IP stream and adjusted by a device associated with a display for rendering the 3D video content in a desired manner. 3D content also may be transmitted in a plurality of IP streams and a device associated with a display for rendering the 3D content may determine which of the plurality of IP streams to decode based upon a mode of operation of the device. A device receiving 3D video content may be configured to adjust the appearance of the content displayed on a display associated with the device. Such adjusting of the appearance may include moving the position of the rendered 3D video content within the display, positioning in band and/or out of band content in front of, behind, or within the rendered 3D video content.

20 Claims, 11 Drawing Sheets

(56) References Cited

U.S. PATENT DOCUMENTS

| | | | |
|---|---|---|---|
| 6,005,620 A | 12/1999 | Yang et al. | |
| 6,055,012 A | 4/2000 | Haskell et al. | |
| 6,072,832 A | 6/2000 | Katto | |
| 6,097,435 A | 8/2000 | Stanger et al. | |
| 6,108,379 A | 8/2000 | Shikakura et al. | |
| 6,380,981 B1 | 4/2002 | Kasezawa et al. | |
| 6,392,689 B1 | 5/2002 | Dolgoff | |
| 6,532,075 B1 | 3/2003 | Edwards et al. | |
| 6,573,819 B1 | 6/2003 | Oshima et al. | |
| 6,674,484 B1 | 1/2004 | Boland et al. | |
| 6,686,926 B1 | 2/2004 | Kaye | |
| 6,704,034 B1 | 3/2004 | Rodriguez et al. | |
| 6,747,610 B1 | 6/2004 | Taima et al. | |
| 6,768,774 B1 | 7/2004 | MacInnis et al. | |
| 6,795,863 B1* | 9/2004 | Doty, Jr. | 709/231 |
| 7,149,665 B2 | 12/2006 | Feld et al. | |
| 7,394,977 B2 | 7/2008 | Park et al. | |
| 7,522,664 B1 | 4/2009 | Bhaskar et al. | |
| 7,733,385 B2 | 6/2010 | Watanabe et al. | |
| 8,189,033 B2 | 5/2012 | Ikeda et al. | |
| 8,260,090 B2 | 9/2012 | Ebato et al. | |
| 8,786,673 B2 | 7/2014 | Cheng et al. | |
| 2001/0026372 A1 | 10/2001 | Misawa | |
| 2002/0008906 A1 | 1/2002 | Tomita | |
| 2002/0009137 A1 | 1/2002 | Nelson et al. | |
| 2002/0034375 A1 | 3/2002 | Suda | |
| 2002/0070981 A1 | 6/2002 | Kida | |
| 2002/0083464 A1 | 6/2002 | Tomsen et al. | |
| 2002/0164153 A1 | 11/2002 | Tanaka et al. | |
| 2003/0052877 A1 | 3/2003 | Schwegler et al. | |
| 2003/0053485 A1 | 3/2003 | Chuah et al. | |
| 2003/0108341 A1 | 6/2003 | Oshima et al. | |
| 2004/0076331 A1 | 4/2004 | Gioia | |
| 2004/0207613 A1 | 10/2004 | Morisawa | |
| 2004/0218269 A1 | 11/2004 | Divelbiss et al. | |
| 2004/0218906 A1 | 11/2004 | Chaney | |
| 2005/0212984 A1* | 9/2005 | Wu et al. | 349/15 |
| 2006/0015580 A1 | 1/2006 | Gabriel et al. | |
| 2006/0098867 A1 | 5/2006 | Gallagher | |
| 2006/0153289 A1 | 7/2006 | Choi et al. | |
| 2006/0177124 A1 | 8/2006 | Ha | |
| 2006/0221178 A1 | 10/2006 | Yun et al. | |
| 2006/0262856 A1 | 11/2006 | Wu et al. | |
| 2006/0268008 A1 | 11/2006 | Idesawa et al. | |
| 2007/0014367 A1 | 1/2007 | Zhou | |
| 2007/0169156 A1 | 7/2007 | Zeng | |
| 2007/0223538 A1 | 9/2007 | Rodgers | |
| 2007/0247477 A1 | 10/2007 | Lowry et al. | |
| 2008/0089428 A1 | 4/2008 | Nakamura et al. | |
| 2008/0219381 A1* | 9/2008 | Karaoguz et al. | 375/316 |
| 2008/0247726 A1* | 10/2008 | Lee et al. | 386/52 |
| 2008/0252719 A1 | 10/2008 | Choi et al. | |
| 2009/0052450 A1 | 2/2009 | Mockett | |
| 2009/0073316 A1 | 3/2009 | Ejima | |
| 2009/0116732 A1 | 5/2009 | Zhou et al. | |
| 2009/0199230 A1 | 8/2009 | Kumar et al. | |
| 2009/0245347 A1 | 10/2009 | Lee et al. | |
| 2009/0288125 A1 | 11/2009 | Morioka | |
| 2009/0289951 A1 | 11/2009 | Matsuda | |
| 2010/0021141 A1 | 1/2010 | Yamashita et al. | |
| 2010/0086285 A1 | 4/2010 | Sasaki et al. | |
| 2010/0111417 A1 | 5/2010 | Ward et al. | |
| 2010/0134603 A1 | 6/2010 | Itoh | |
| 2010/0182404 A1 | 7/2010 | Kuno | |
| 2010/0208042 A1 | 8/2010 | Ikeda et al. | |
| 2010/0208750 A1 | 8/2010 | Kim et al. | |
| 2010/0215343 A1 | 8/2010 | Ikeda et al. | |
| 2010/0260268 A1 | 10/2010 | Cowan et al. | |
| 2010/0263003 A1 | 10/2010 | Gupta et al. | |
| 2010/0275238 A1 | 10/2010 | Nagasawa et al. | |
| 2010/0321390 A1 | 12/2010 | Kim et al. | |
| 2011/0032327 A1 | 2/2011 | Ikeda et al. | |
| 2011/0043614 A1 | 2/2011 | Kitazato | |
| 2011/0164121 A1 | 7/2011 | Ikeda et al. | |
| 2011/0211049 A1 | 9/2011 | Bassali et al. | |
| 2011/0255003 A1 | 10/2011 | Pontual et al. | |
| 2012/0035498 A1 | 2/2012 | Wilkins | |
| 2012/0113115 A1 | 5/2012 | Cuttner | |
| 2012/0114036 A1 | 5/2012 | Po et al. | |
| 2012/0162363 A1 | 6/2012 | Huang et al. | |
| 2012/0176471 A1 | 7/2012 | Cheng et al. | |
| 2013/0011117 A1 | 1/2013 | Hamada | |
| 2013/0127990 A1 | 5/2013 | Lin et al. | |

FOREIGN PATENT DOCUMENTS

| | | |
|---|---|---|
| CA | 2824708 | 7/2013 |
| EP | 11160925.1 | 4/2011 |
| EP | 11766291.6 | 11/2012 |
| EP | 11855691.9 | 8/2013 |
| WO | 2004/093459 A1 | 10/2004 |

OTHER PUBLICATIONS

TV giants are flatliners in stereo 3-D patents, Rick Merritt, Sep. 18, 2008, downloaded Oct. 4, 2010, http://www.eetimes.com/General/Display/PrintViewContent?contentItemID=4005817, 3 pages.

3-D TV not ready for prime time, Nic Mokhoff, Aug. 14, 2008, downloaded Oct. 4, 2010, http://www.eetimes.com/General/Display/PrintViewContent?contentItemID=4078303, 2 pages.

3DTV: The next format war?, Cliff Roth, Sep. 9, 2008, downloaded Oct. 4, 2010, http://www.eetimes.com/General/Display/PrintViewContent?contentItemID=4030071, 1 page.

Is 3D Game ON?: Sports Could Kick-Start Market, Linda Hardesty, Jan. 1, 2010, downloaded on Mar. 23, 2010 from http://www.cable360.net/ct/sections/features/Is-3D-Game-On-Sports-Could-Kick-Start-Market.html.

3D TV—a distant perspective, Christoph Hammerschmidt, Sep. 7, 2009, downloaded Oct. 4, 2010 from http://www.eetimes.com/General/DisplayPrintViewContent?contentItemId=4196177, 2 pages.

3D TV User Interface to Any STB or Cl+ Device to be Unveiled at ActiveVideo Networks Exhibit at IBC, Active Video Networks, Sep. 2, 2010, downloaded Oct. 4, 2010 from http://www.eetimes.com/General/Display/PrintViewContent?contentItemID=4208274, 2 pages.

Trident offers three new ideas to bring 3D to mainstream TVs, Junko Yoshida, Sep. 3, 2010, downloaded Oct. 4, 2010 from http://www.eetimes.com/General/DisplayPrintViewContent?contentItemID=4207346, 2 pages.

AT&T U-verse TV Adds Six Free 3D IMAX Theatre Films to 3D Technology Package, AT&T, Inc., Sep. 15, 2010, downloaded Oct. 4, 2010 from http://www.eetimes.com/General/DisplayPrintViewContent?contentItemID=4208544, 2 pages.

CEA will explore 3DTV standard, Rick Merritt, Jul. 23, 2008, downloaded Oct. 4, 2010 from http://www.eetimes.com/General/DisplayPrintViewContent?contentItemID=4078148, 2 pages.

Introducing DLP 3DTV, David C. Hutchinson and Ken Bell, Dec. 19, 2007, downloaded Oct. 4, 2010 from http://www.eetimes.com/General/DisplayPrintViewContent?contentItemID=4013439, 6 pages.

Grundig unveils 3D digital TV technique, Christoph Hammerschmidt, Sep. 6, 2005, downloaded Oct. 4, 2010 from http://www.eetimes.com/General/DisplayPrintViewContent?contentItemID=4078545, 1 page.

Motorola Introduces Innovative 3D TV Set-Tops for Cable, Motorola Corporate, Apr. 12, 2010, downloaded Oct. 4, 2010 from http://www.eetimes.com/General/DisplayPrintViewContent?contentItemID=4202924, 3 pages.

Stereoscopic 3D content for the home unveiled at NAB, Dennis Barker, Apr. 15, 2008, downloaded Oct. 4, 2010 from http://www.eetimes.com/General/DisplayPrintViewContent?contentItemID=4103426.

3D TV Service will start, Han Jung-hoon, Sep. 10, 2009, etnews.co.kr, 1 page.

Sensio Technologies Launches 3D Content Distribution Services, The Hollywood Reporter, downloaded Jan. 9, 2011 from http://www.hollywoodreporter.com/news/sensio-technologies-launches-3d-content-67784, 1 page.

(56) References Cited

OTHER PUBLICATIONS

Fans see USC-Ohio State Game in 3-D, Los Angeles Times, Mark Medina, Sep. 13, 2009, 2 pages.
Insight Media, The State of 3D in the Home—Apr. 2010, A presentation by Insight Media for the 3D@Home Consortium, http;//www.InsightMedia.Info, 47 pages.
3D Video on Demand arrives on Orange TV in France, Orange Press Release, Paris, Nov. 8, 2010, 2 pages.
Overview of MPEG Standards for 3D TV, White Paper, Motorola, www.motorola.com, © Motorola, Inc. 2010, 4 pages.
CES 2011: Sensio Launches Trio of 3D Technologies, Jason Dachman, Jan. 3, 2011 downloaded Jan. 9, 2011; http:/sportsviodeo. org/main/blog/2011/01/03/ces-2010-sensio-launches-trio-of-3d-technologies/print, 1 page.
Sensio, History of 3D, © 2006 Sensio, downloaded Jan. 9, 2011, http:/www.sensio.tv/en/3d/3d_history/default.3d, 1 page.
Technology/Manufacturer Sensio 3DTechnology, The 3D Reborn, © 2006 Sensio, downloaded Jan. 9, 2011, http://www.sensio.tv/en/technologie_manufacturier/default.3d, 2 pages.
Trident, Video Processing Required for 3DTV Displays, Markus Schu, 7 pages, Undated.
NXP, Video Processing for Stereoscopic Content, Dr. E.B. Bellers, O.P. Ganwal and P. de Greef, 12 pages, Undated.
3D@Home Consortium, Accelerating the adoption of quality 3D into homes worldwide, downloaded Dec. 20, 2010; http://www.3dathome.org/resources-glossary.aspx, 27 pages.
Sensio enables manufacturers to offer easy access to library of 3D content through VOD providers, Apr. 1, 2011 by 3Droundabout, Jan. 4, 2011, downloaded Jan. 9, 2011, http://3droundabout.com/2011/01/518/sensio-enables-manufacturers-to-offer-access-to-library, 2 pages.
MPEG-4 3D graphics player fits mobile handsets, Rich Nass, May 16, 2006, downloaded Oct. 4, 2010, http://www.eetimes.com/General/Display/PrintViewContent?contentItemID=4084236, 1 page.
"Sky Makes 3D History", Sky 3D channel to launch in Apr. (Jan. 28, 2010), printed on Feb. 12, 2010 from http://www.skysports.com/story/0,19528,11096_5889013,00.html.
Hardesty, Linda, "Is 3D Game on?: Sports Could Kick-Start Market," (Jan. 1, 2010), printed on Mar. 23, 2010 from http://www.cable360.net/ct/sections/features/ls-3D-Game-On-Sports-Could-Kick-Start-Market.html.

Extended European Search Report—EP 11160925—dated Aug. 27, 2013.
Tekalp A M et al: "3DTV over IP, End-to-end streaming of multiview video", IEEE Signal Processing Magazine, IEEE Service Center, Piscataway, NJ, US, vol. 24, No. 6, Nov. 1, 2007 (2007-11-81), pp. 77-87, XP002689554, ISSN: 1053-5888, DOI: 10.1109/MSP.2007.905878 Retrieved from the Internet: URL:http:f/elvera.nue.tu-berlin.de/files/1115Tekalp2007.pdf.
Anonymous: "ISO/IEC FDIS 23000-11 (Stereoscopic Video Application Format)", 86. MPEG Meeting;Oct. 13, 2008-Oct. 17, 2008; Busan; (Motion PictureExpert Group or ISO/IEC JTC1/SC29/WG11), No. N10280, Jun. 11, 2009 (Jun. 11, 2009), XP838816773, ISSN: 0000-0038.
Extended European Search Report—EP 11766291.6—dated Sep. 25, 2013.
European Examination Report—EP Application 11160925.1—dated Jan. 13, 2015.
Aksay, Anil et al., "End-to-end stereoscopic video streaming with content-adaptive rate and format control," Signal Processing: Image Communication (2007).
Anthony Vetro. "Representation and Coding Formats for Stereo and Multiview Video", Jan. 1, 2010 (Jan. 1, 2010). pp. 51-73, XP009162539.
European Search Report—EP App. 11855691.9—dated Feb. 25, 2015.
Vetro et al, Frame Compatible Formats for 3D Video Distribution, 2010.
Canadian Office Action—CA Appl. 2,795,694—dated Jan. 19, 2017.
European Office Action—EP App 11766291.6—dated Feb. 16, 2016.
Response to European Office Action—EP 11855691.9—dated Sep. 11, 2015.
Response to European OA—EP Appl. 11766291.6—submitted Aug. 24, 2015.
Canadian Office Action—CA Appl. 2,824,708—dated Jan. 24, 2017.
Mar. 10, 2017—Canadian Office Action—CA 2735591.
Mar. 21, 2017—European Office Action—EP 11855691.9.
European Office Action—EP 11766291.6—dated Apr. 24, 2015.

* cited by examiner

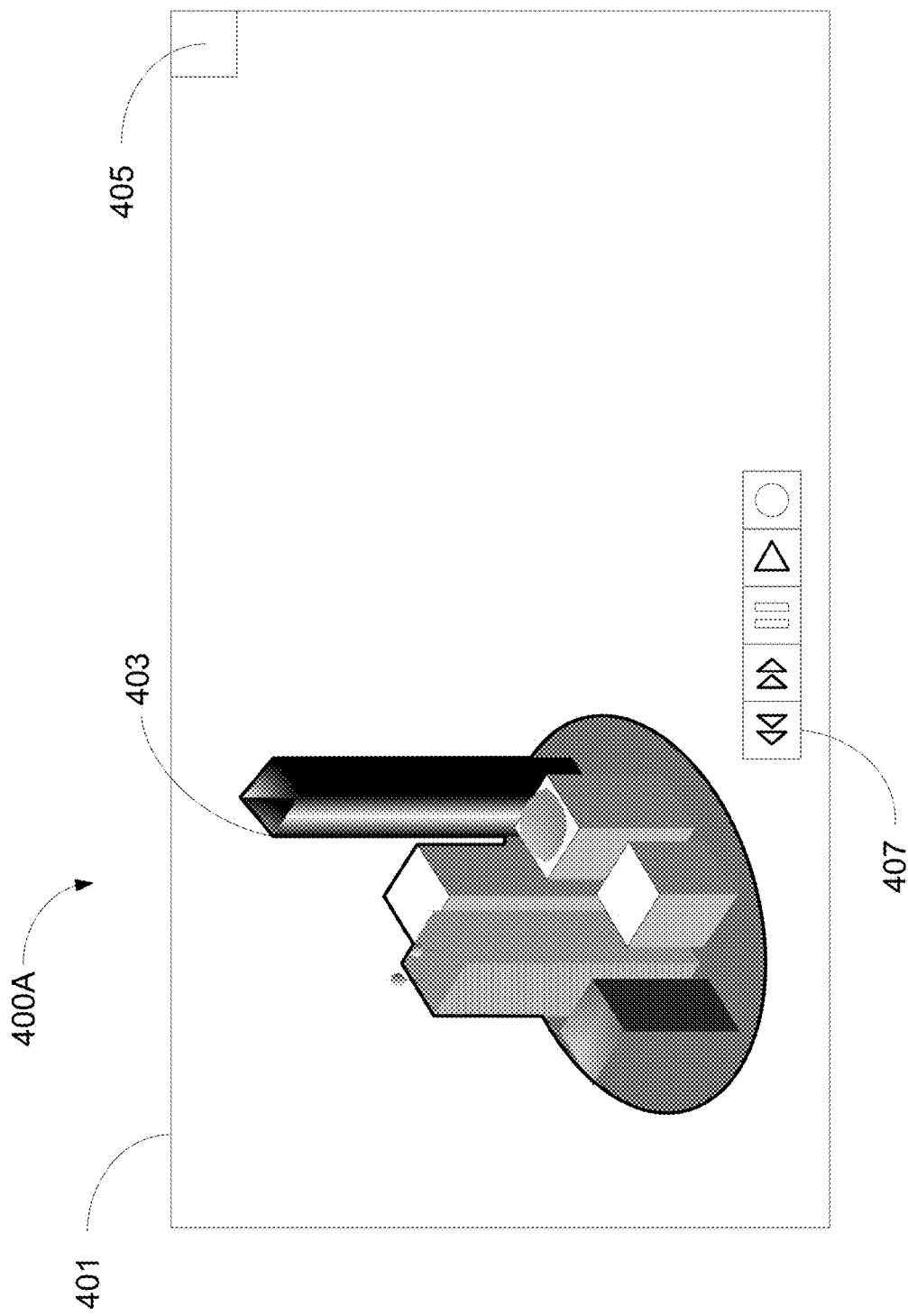

STREAMING AND RENDERING OF 3-DIMENSIONAL VIDEO BY INTERNET PROTOCOL STREAMS

This application is a divisional of and claims priority from pending application Ser. No. 12/755,382 filed Apr. 6, 2010, the content of which is herein incorporated by reference in its entirety.

BACKGROUND

Aspects of the present disclosure relate to transmission and receipt of 3-dimensional (3D) video content and to Internet protocol (IP) streaming of 3D video content to a user device.

SUMMARY

In light of the foregoing background, the following presents a simplified summary of the present disclosure in order to provide a basic understanding of some features of the disclosure. This summary is provided to introduce a selection of concepts in a simplified form that are further described below. This summary is not intended to identify key features or essential features of the disclosure.

Systems and methods for transmitting and receiving 3D video content via an Internet protocol (IP) stream are described. In accordance with one aspect of the present disclosure, 3D video content for a first onscreen location on a display of an output device may be outputted. A user-defined request to adjust the 3D video content may be received to reposition onscreen 3D video content to a different location on the display (e.g., upper right, full screen, etc.) and/or to a different depth within a 3D environment being rendered on the display. The 3D video content may be adjusted based upon the request, and the adjusted 3D video content for a second location on the display of the output device may be outputted. Additionally, the 3D video content may be streamed to a different physical device at a different location (e.g., requesting a separate stream for a bedroom television having different viewing capabilities), or to the same device at a different physical location (e.g., moving a mobile 3D viewing device to a different environment, and adjusting characteristics of the image to account for the new environment (e.g., adjusting edge conflict settings or different service provider settings)).

In accordance with another aspect of the present disclosure, 3D video content may be received by a transmission system device. For each of a plurality of different user device formats, the received 3D video content may be encoded to generate a corresponding plurality of IP streams. The plurality of IP streams may be transmitted over a distribution network.

In accordance with one or more other aspects of the present disclosure, a first IP stream of a plurality of IP streams to decode first 3D video content in the first IP stream based upon a first mode of operation of an output device may be determined. The first 3D video content in the first IP stream may be decoded and outputted for a first location of a display of the output device. A user-defined request to adjust the first 3D video content may be received, and a second IP stream of the plurality of IP streams to decode second 3D video content in the second IP stream based upon a second mode operation of the output device may be determined. The second 3D video content in the second IP stream may be decoded and outputted for a second location of the display of the output device.

In accordance with still other aspects of the present disclosure, an IP stream including encoded 3D video content may be received. The 3D video content in the IP stream may be decoded and adjusted based upon a first mode of operation of an output device. Then, the adjusted 3D video content for a first location of a display of the output device may be outputted. Although described in relation to IP video, concepts of the present disclosure may be implemented for any format capable of carrying 3D video content.

BRIEF DESCRIPTION OF THE DRAWINGS

Some embodiments of the present disclosure are illustrated by way of example, and not by way of limitation, in the figures of the accompanying drawings and in which like reference numerals refer to similar elements.

FIGS. 4A-4B illustrate example user interfaces for adjusting 3D video content in accordance with one or more features of the disclosure herein;

DETAILED DESCRIPTION

In the following description of the various embodiments, reference is made to the accompanying drawings, which form a part hereof, and in which is shown by way of illustration various embodiments in which features may be practiced. It is to be understood that other embodiments may be utilized and structural and functional modifications may be made.

Aspects of the disclosure are operational with numerous general purpose or special purpose computing system environments or configurations. Examples of computing systems, environments, and/or configurations that may be suitable for use with features described herein include, but are not limited to, personal computers, server computers, handheld or laptop devices, multiprocessor systems, microprocessor-based systems, set top boxes, digital video recorders, programmable consumer electronics, Internet connectable display devices, network PCs, minicomputers, mainframe computers, distributed computing environments that include any of the above systems or devices, and the like.

The features may be described in the general context of computer-executable instructions, such as program modules, being executed by a computer. Generally, program modules include routines, programs, objects, components, data structures, etc. that perform particular tasks or implement particular abstract data types. Features herein may also be practiced in distributed computing environments where tasks are performed by remote processing devices that are linked through a communications network. In a distributed computing environment, program modules may be located in both local and remote computer storage media including memory storage devices. Although described in relation to IP video, concepts of the present disclosure may be implemented for any format capable of carrying 3D video content.

Figure 1:
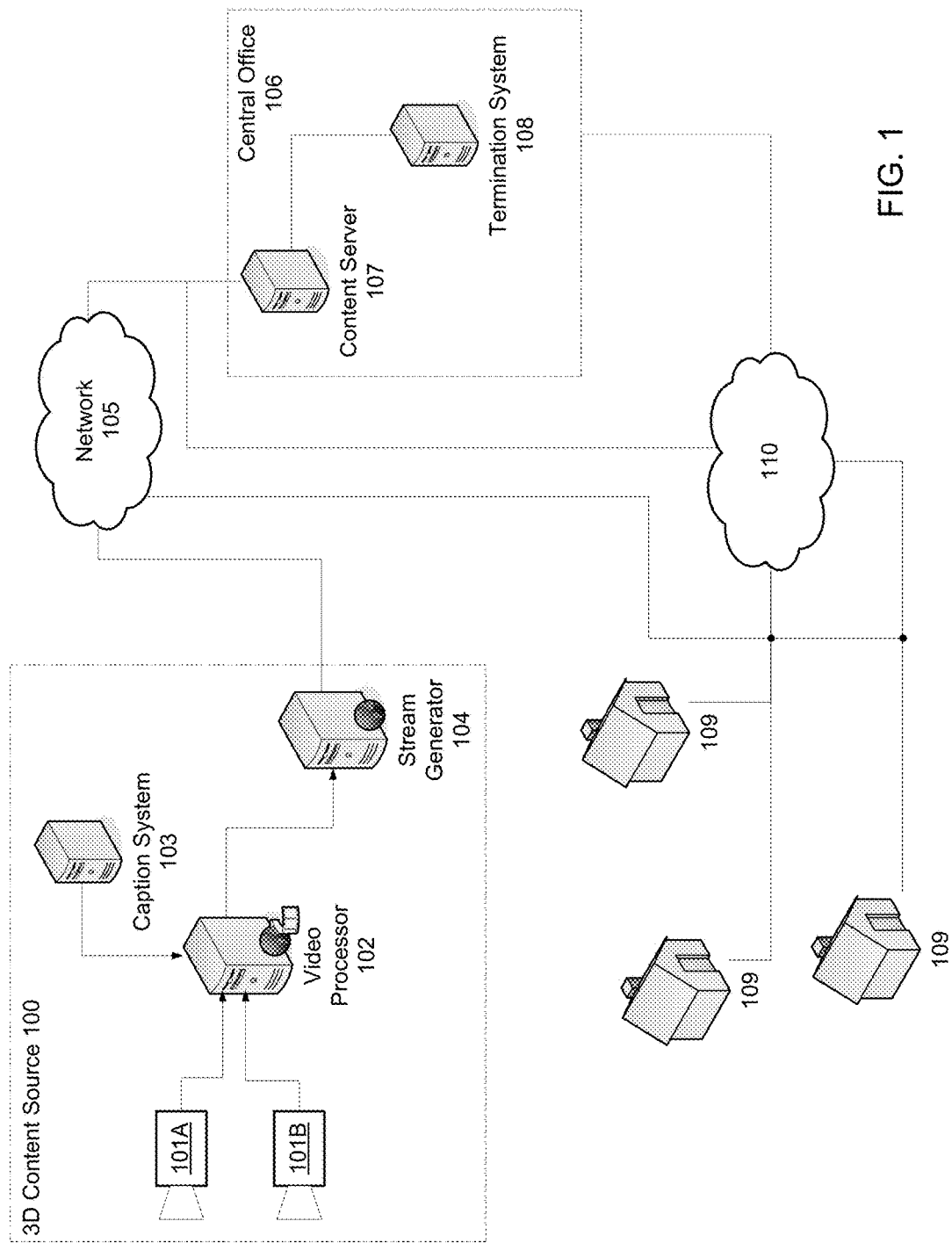
FIG. 1 illustrates an example network for IP streaming of 3D video content in accordance with one or more features of the disclosure herein.

FIG. 1 illustrates an example network for IP streaming of 3D video content in accordance with one ore more features of the disclosure. Aspects of the network allow for streaming of 3D video content over the Internet. One or more aspects of the network deliver 3D stereoscopic content to Internet connected display devices. Still other aspects of the network adapt stereoscopic content to a variety of network interface device technologies, including devices capable of rendering 2-dimensional (2D) and 3D content. Further aspects of the network adapt stereoscopic content to a variety of channel characteristics. Other aspects of the network adapt the graphics of an output device to 3D viewing preferences of a user.

3D video content, including live 3D video content, may be offered by one or more 3D content sources 100. The sources 100 may capture video 3D content using one or more cameras 101A and 101B. Cameras 101A and/or 101B may be any of a number of cameras that are configured to capture video content. In accordance with one or more aspects of the present disclosure, cameras 101A and 101B may be configured to capture video content for a left eye and a right eye, respectively, of an end viewer. The captured video content from cameras 101A and 101B may be used for generation of 3D video content for transmission to an end user output device. The data output from the cameras 101A and 101B may be sent to a stereographer/production (e.g., video processing) system 102 for initial processing of the data. Such initial processing may include any of a number of processing of such video data, for example, cropping of the captured data, color enhancements to the captured data, and association of audio to the captured video content.

An optional caption insertion system 103 may provide closed-captioning data accompanying video from the cameras. The closed-captioning data may, for example, contain textual transcripts of spoken words in an audio track that accompanies the video stream. Captioning insertion system 103 may provide textual and/or graphic data that may be inserted, for example, at corresponding time sequences to the data from the stereographer/production system 102. For example, data from the stereographic/production system 102 may be 3D video content corresponding to a stream of live content of a sporting event. Caption insertion system 103 may be configured to provide captioning corresponding to audio commentary of a sports analyst made during the live sporting event, for example, and processing system 102 may insert the captioning to one or more video streams from cameras 101A,B. Alternatively, the captioning may be provided as a separate stream from the video stream. Textual representations of the audio commentary of the sports analyst may be associated with the 3D video content by the caption insertion system 103. Data from the captioning system 103 and/or the video processing system 102 may be sent to a stream generation system 104, to generate a digital datastream (e.g., an Internet Protocol stream) for an event captured by the cameras 101A,B.

The stream generation system 104 may be configured to multiplex two streams of captured and processed video data from cameras 101A and 101B into a single data signal, which may be compressed. The caption information added by the caption insertion system 103 may also be multiplexed with these two streams. As noted above, the generated stream may be in a digital format, such as an IP encapsulated format. Stream generation system 104 may be configured to encode the 3D video content for a plurality of different formats for different end devices that may receive and output the 3D video content. As such, stream generation system 104 may be configured to generate a plurality of Internet protocol (IP) streams of encoded 3D video content specifically encoded for the different formats for rendering. For example, one of the IP streams may be for rendering the 3D video content on a display being utilizing by a polarized headgear system, while another one of the IP streams may be for rendering the 3D video content on a display being utilized by an anaglyph headgear system. Any of a number of technologies for viewing rendered 3D video content may be utilized in accordance with the concepts disclosed herein. Although anaglyph and polarized headgear are used as examples herein, other 3D headgear types can be used as well, such as active shutter and dichromic gear.

The single or multiple encapsulated IP streams may be sent via a network 105 to any desired location. The network 105 can be any type of communication network, such as satellite, fiber optic, coaxial cable, cellular telephone, wireless (e.g., WiMAX), twisted pair telephone, etc., or any combination thereof. In some embodiments, a service provider's central office 106 may make the content available to users. The central office 106 may include, for example, a content server 107 configured to communicate with source 100 via network 105. The content server 107 may receive requests for the 3D content from a user, and may use termination system, such as a modem termination system 108 to deliver the content to users 109 through a network of communication lines 110. The termination system 108 may be, for example, a cable modem termination system operating according to a standard, such as the Data Over Cable System Interface Specification (DOCSIS), and the network of communication lines 110 may be a series of coaxial cable and/or hybrid fiber/coax lines. Alternative termination systems may use optical network interface units to connect to a fiber optic communication line, digital subscriber line (DSL) interface circuits to connect to a twisted pair telephone line, satellite receiver to connect to a wireless satellite line, cellular telephone transceiver to connect to a cellular telephone network (e.g., wireless 3G, 4G, etc.), and any other desired termination system that can carry the streams described herein.

A home of a user, such as the home 201 described in more detail below, may be configured to receive data from network 110 or network 105. The home of the user may include a home network configured to receive encapsulated 3D video content and distribute such to one or more viewing devices, such as televisions, computers, mobile video devices, 3D headsets, etc. The viewing devices, or a centralized device, may be configured to adapt graphics of an output device to 3D viewing preferences of a user. For example, 3D video content for output to a viewing device may be configured for operation with a polarized lens headgear system. As such, a viewing device or centralized server may be configured to recognize and/or interface with the polarized lens headgear system to render an appropriate 3D video image for display.

Figure 2:
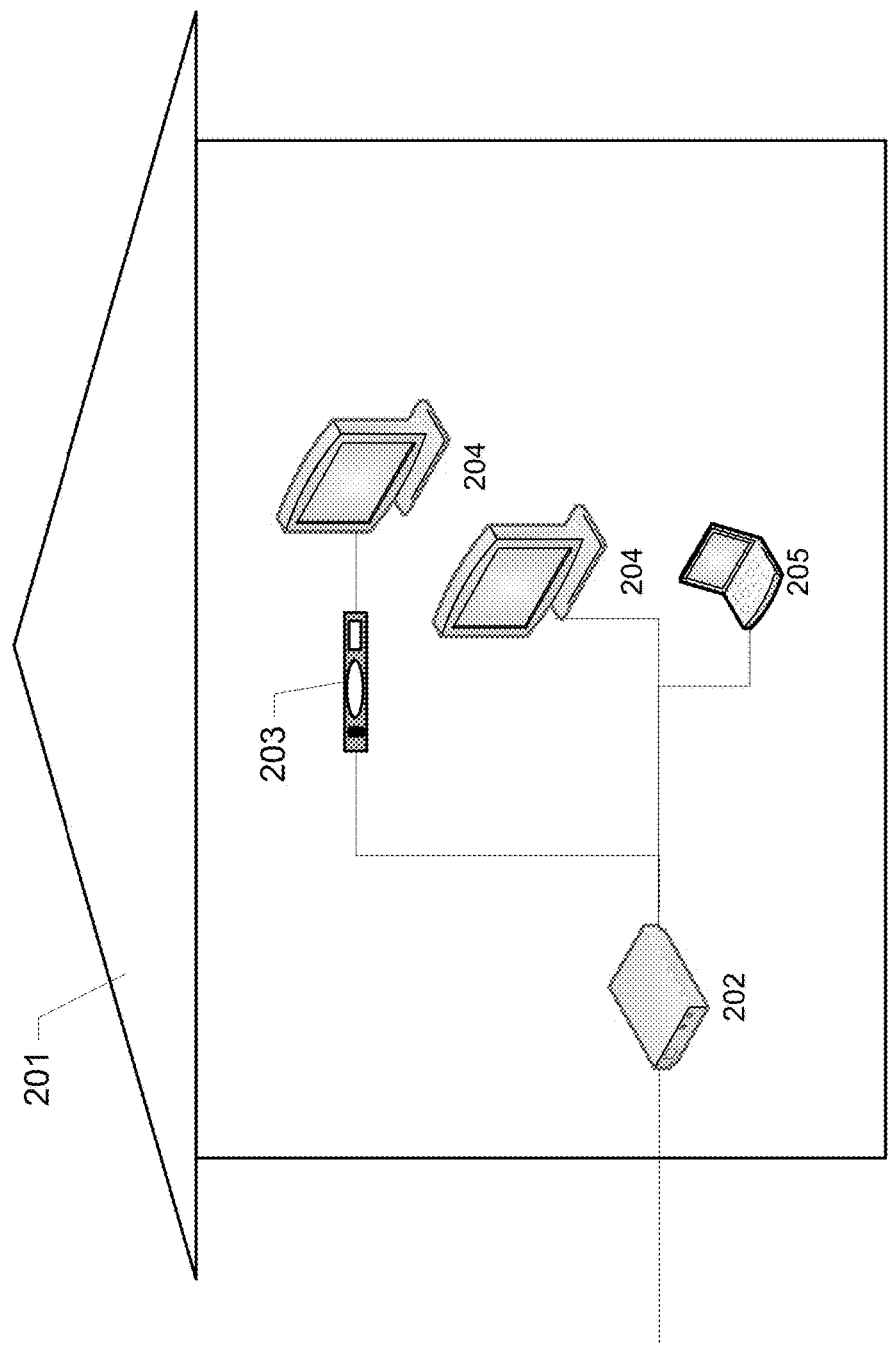
FIG. 2 illustrates an example home with a home gateway, various adaptive players, and various communication devices on which various features described herein may be implemented.

FIG. 2 illustrates a closer view of a home 201 that may be connected to an external network, such as the network in FIG. 1, via an interface. An external network transmission line (coaxial, fiber, wireless, etc.) may be connected to a home gateway device, e.g., content reception device, 202. The gateway device 202 may be a computing device configured to communicate over the network 110 with a provider's central office 106 or directly with network 105.

The gateway 202 may be connected to a variety of devices within the home, and may coordinate communications among those devices, and between the devices and networks outside the home 201. For example, the gateway 202 may include a modem (e.g., a DOCSIS device communicating with a CMTS), and may offer Internet connectivity to one or more computers within the home. The connectivity may also be extended to one or more wireless routers. For example, a wireless router may be an IEEE 802.11 router, local cordless telephone (e.g., Digital Enhanced Cordless Telephone—DECT), or any other desired type of wireless network. Various wireless devices within the home, such as a DECT phone (or a DECT interface within a cordless telephone), a portable media player, and portable laptop computer, may communicate with the gateway 202 using a wireless router.

The gateway 202 may also include one or more voice device interfaces, to allow the gateway 202 to communicate with one or more voice devices, such as telephones. The telephones may be a traditional analog twisted pair telephone (in which case the gateway 202 may include a twisted pair interface), or it may be a digital telephone such as a Voice Over Internet Protocol (VoIP) telephone, in which case the phone may simply communicate with the gateway 202 using a digital interface, such as an Ethernet interface.

The gateway 202 may communicate with the various devices within the home using any desired connection and protocol. For example, an in-home MoCA (Multimedia Over Coax Alliance) network may use a home's internal coaxial cable network to distribute signals to the various devices in the homes. Alternatively, some or all of the connections may be of a variety of formats (e.g., MoCA, Ethernet, HDMI, DVI, twisted pair, etc.), depending on the particular end device being used. The connections may also be implemented wirelessly, using local wi-fi, WiMax, Bluetooth, or any other desired wireless format.

Figure 3:
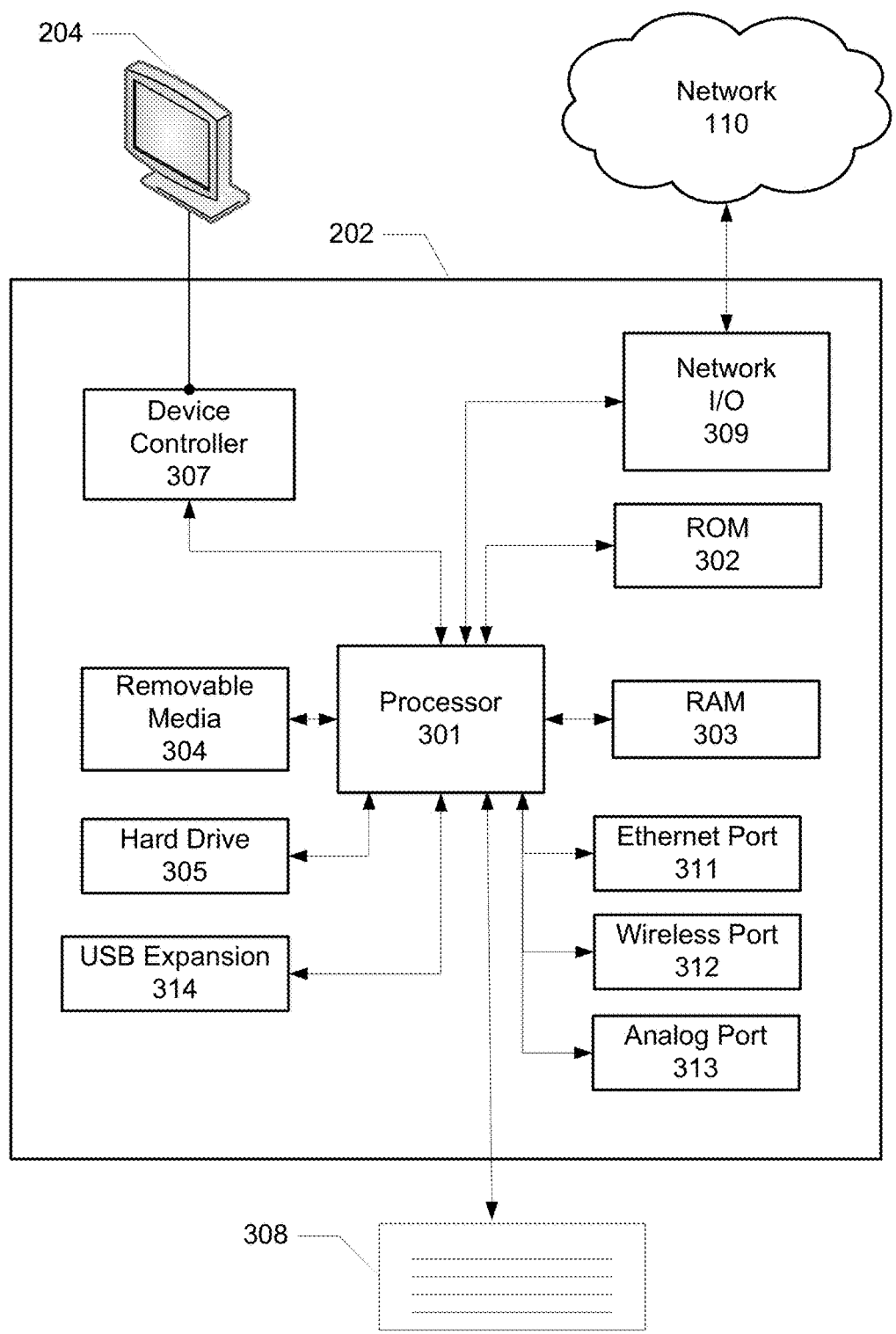
FIG. 3 illustrates an example computing device on which various features described herein may be implemented.

The gateway 202, which may comprise, for example, one or more set-top boxes (STBs), digital video recorders (DVRs), etc., can serve as a network interface between devices in the home and a network, such as the networks illustrated in FIG. 1. Additional details of an example gateway 202 are shown in FIG. 3, discussed further below. The gateway 202 may receive and decode content via a transmission line (e.g., optical, coaxial, wireless, etc.), and may provide that content to users for consumption, such as for viewing 3D video content on a display of an output device 204, such as a 3D ready monitor. Alternatively, televisions, or other viewing devices 204, may be connected to the network's transmission line directly without a separate interface device, and may perform the functions of the interface device or gateway. Any type of content, such as video, video on demand, audio, Internet data etc., can be accessed in this manner.

FIG. 3 illustrates a computing device that may be used to implement the network gateway 202, although similar components (e.g., processor, memory, computer-readable media, etc.) may be used to implement any of the devices described herein. The gateway 202 may include one or more processors 301, which may execute instructions of a computer program to perform any of the features described herein. Those instructions may be stored in any type of computer-readable medium or memory, to configure the operation of the processor 301. For example, instructions may be stored in a read-only memory (ROM) 302, random access memory (RAM) 303, removable media 304, such as a Universal Serial Bus (USB) drive, compact disc (CD) or digital versatile disc (DVD), floppy disk drive, or any other desired electronic storage medium. Instructions may also be stored in an attached (or internal) hard drive 305.

The gateway 202 may include one or more output devices, such as a display 204 (or an external television that may be connected to a set-top box), and may include one or more output device controllers 307, such as a video processor. There may also be one or more user input devices 308, such as a wired or wireless remote control, keyboard, mouse, touch screen, microphone, etc. The gateway 202 may also include one or more network input/output circuits 309, such as a network card to communicate with an external network and/or a termination system 108. The physical interface between the gateway 202 and a network, such as the network illustrated in FIG. 1 may be a wired interface, wireless interface, or a combination of the two. In some embodiments, the physical interface of the gateway 202 may include a modem (e.g., a cable modem), and the external network may include a television distribution system, such as a coaxial, fiber, or hybrid fiber/coaxial distribution system (e.g., a DOC SIS network).

The gateway 202 may include a variety of communication ports or interfaces to communicate with the various home devices. The ports may include, for example, Ethernet ports 311, wireless interfaces 312, analog ports 313, and any other port used to communicate with devices in the home. The gateway 202 may also include one or more expansion ports 314. The expansion ports 314 may allow the user to insert an expansion module to expand the capabilities of the gateway 202. As an example, the expansion port may be a Universal Serial Bus (USB) port, and can accept various USB expansion devices. The expansion devices may include memory, general purpose and dedicated processors, radios, software and/or I/O modules that add processing capabilities to the gateway 202. The expansions can add any desired type of functionality, several of which are discussed further below.

Figure 4B:
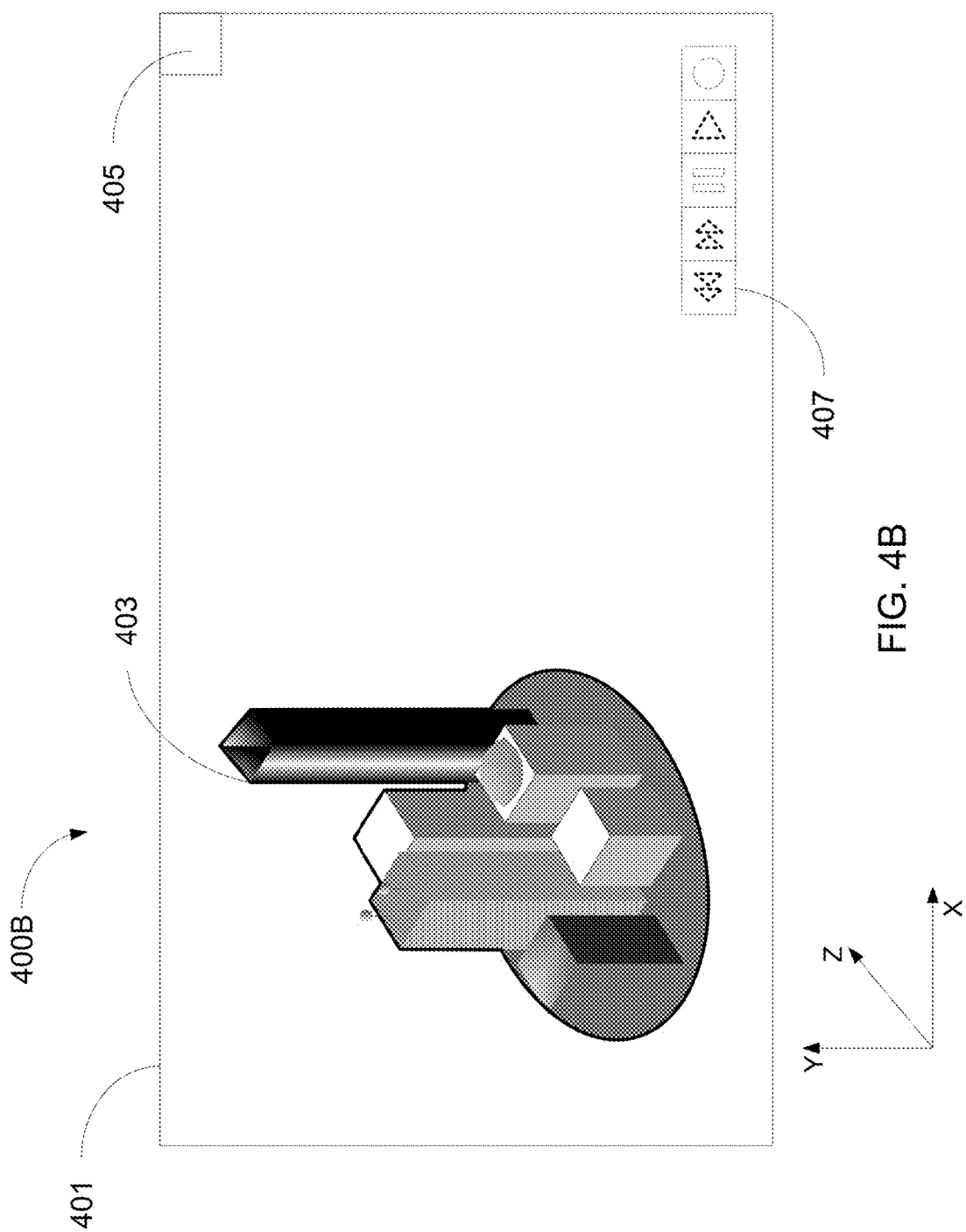

FIGS. 4A-4B illustrate example user interfaces for adjusting 3D video content in accordance with one or more features of the disclosure. FIGS. 4A and 4B illustrate exemplary movement of out of band content, e.g., locally generated content that is not part of the video when streamed from the original source, within a 3D video content environment. In FIG. 4A, an illustrative user interface system 400A is shown in a first state. User interface system 400A includes a user interface 401 that may be displayed on an output device, such as output device 204 shown in FIGS. 2 and 3. Alternatively, reference element 401 in FIG. 4A may be a display. 3D video content 403 may be displayed on the user interface 401. In this example, 3D video content 403 is shown as being rendered within the entire area of the user interface 401. In other examples, 3D video content 403 may be positioned in a portion of the user interface 401.

The rendering of 3D video content 403 within user interface 401 may be changed upon activation of a full display/partial display rendering interface 405. Activation of rendering interface 405 may change the rendering area of the 3D video content 403 from a first position, such as full display to a second position, such as partial display. Illustrative uses of activation button 405 are described in more detail below with respect to FIG. 6. FIG. 4A further illustrates a user controls 407. User controls 407 are illustrative of controls having an ability to perform trickplay operations, such as the ability to rewind, fast forward, pause, play, and/or record 3D video content 403 being displayed.

The images displayed on an output device may include both in-band and out-of-band content. In-band content may be video content that is part of the video stream when streamed from the source (e.g., video images captured by the cameras 101, or video content added to such video images, such as the yellow "first down" marker added to some football game transmissions, banner overlays adding the score, etc.), while out-of-band content may include images that are not part of that original streamed video (e.g., additional video content streamed separately from the video being watched, or additional overlays added by user's own display or gateway). User controls 407 are an example of out of band content, e.g., content generated locally, rendered on user interface 401. User controls 407 may be any type of content for rendering on a user interface 401 including, but not limited to, textual and/or graphical data obtained from an external source, such as a server operatively connected to the Internet. Such a server may be accessible by a network interface device, such as gateway 202 in FIG. 3, connected to an output device that renders user interface 401.

As illustratively shown in FIG. 4A, user controls 407 are an out of band content object shown in front of 3D video content 403 within user interface 401. In a 3D environment, images within the 3D video content 403 may appear to have various depths with respect to each other. In the example of FIG. 4A, user controls 407 appear closest to a viewer, i.e., in front of all of the 3D video content 403. Yet, a viewer may not want to see the user controls 407 in such a prominent manner within the user interface 401. The viewer may desire to change the appearance of the user control 407 to appear as being behind some or all of 3D video content 403. Such an example is shown in FIG. 4B.

In FIG. 4B, an illustrative user interface system 400B is shown in a second state. As described above with respect to FIG. 4A, a viewer may desire to have the appearance of the user controls 407 as being behind some of the 3D video content 403. As shown in FIG. 4B, the position of user controls 407 within user interface 401 has changed. The position has changed from a center display position in the lower portion of the user interface 401 in FIG. 4A to a right display position in the lower portion of the user interface 401 in FIG. 4B. The user controls 407 also may be made to appear at different depths to a user along the Z axis. In addition to the position of the user controls 407 changing with respect to the user interface 401, the user controls 407 further are shown as being included within, e.g., appearing as incorporated within, 3D video content 403. The example of being included within 3D video content 403 is shown in FIG. 4B as a fainter image being displayed for user control 407. Any of a number of imaging techniques, such as using translucency and/or blockage behind an opaque image in the 3D video content 403, may be utilized to make the user controls 407 appear as being within the 3D video content 403. For example, the 3D video content 403 may be an image of a window where the pane of glass is partially translucent. In such an example, in moving user controls 407 behind the window of the 3D video content, user controls 407 may appear as if it can be seen through the window.

Any of a number of different changes to the appearance of out of band content, e.g., locally generated content that is not part of the video when streamed from the original source, may be implemented herein. In addition, the position and/or size of the 3D video content may be changed. Still further, in band content, e.g., content included in the video streamed to the premises of a viewer, may similarly be adjusted as described above with reference to FIGS. 4A and 4B. Exemplary in band content includes streaming banners of information for sporting events, such as time on clock, score, updates, etc., that may be included with 3D video content of the sporting event itself (and not necessarily part of an image captured by cameras 101). Such in band content is not generated locally at the user's premises, but is rather generated upstream before receipt at a viewer location.

Figure 5A:
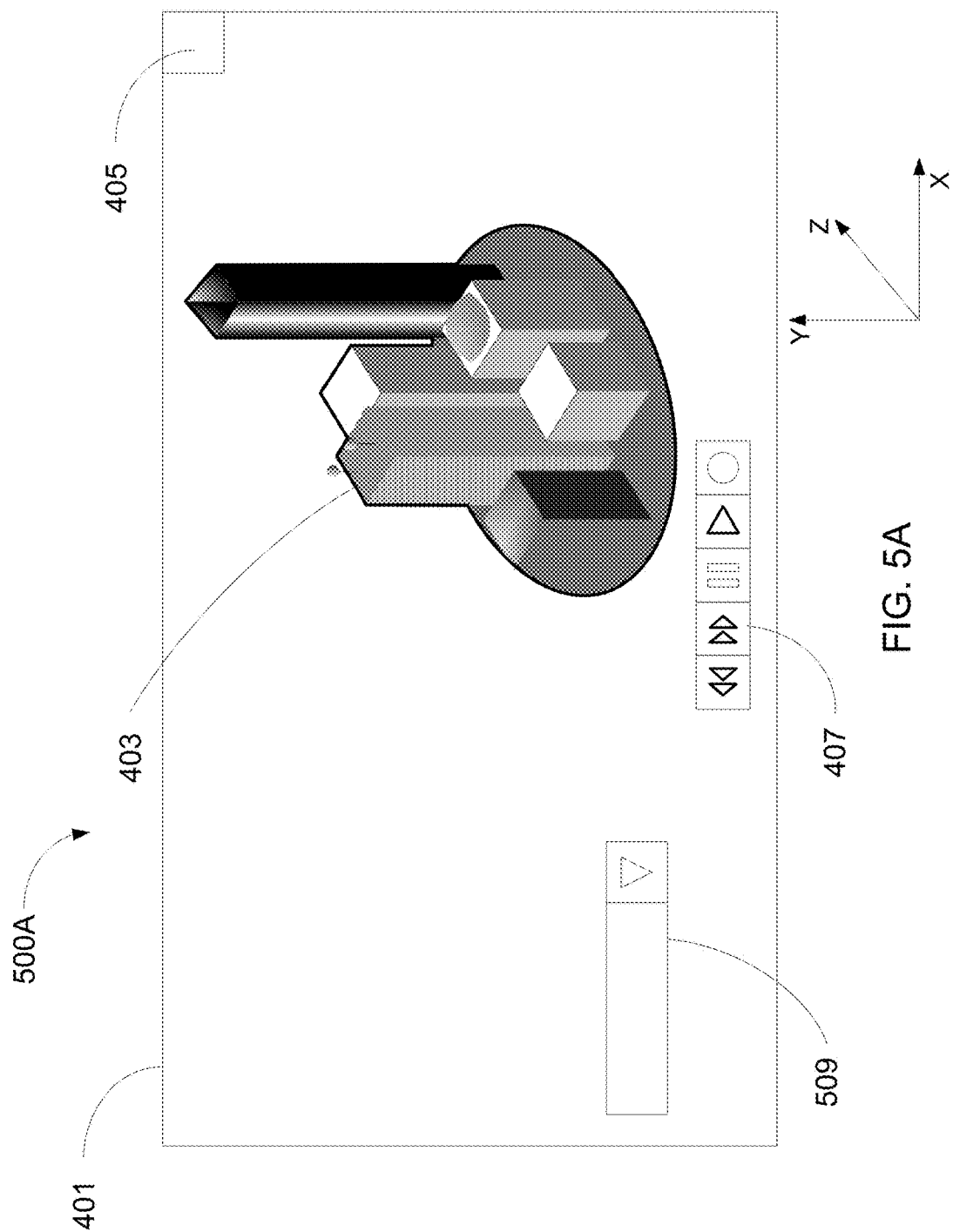
FIGS. 5A-5C illustrate example user interfaces for adjusting 3D video content in accordance with one or more features of the disclosure herein.
Figure 5B:
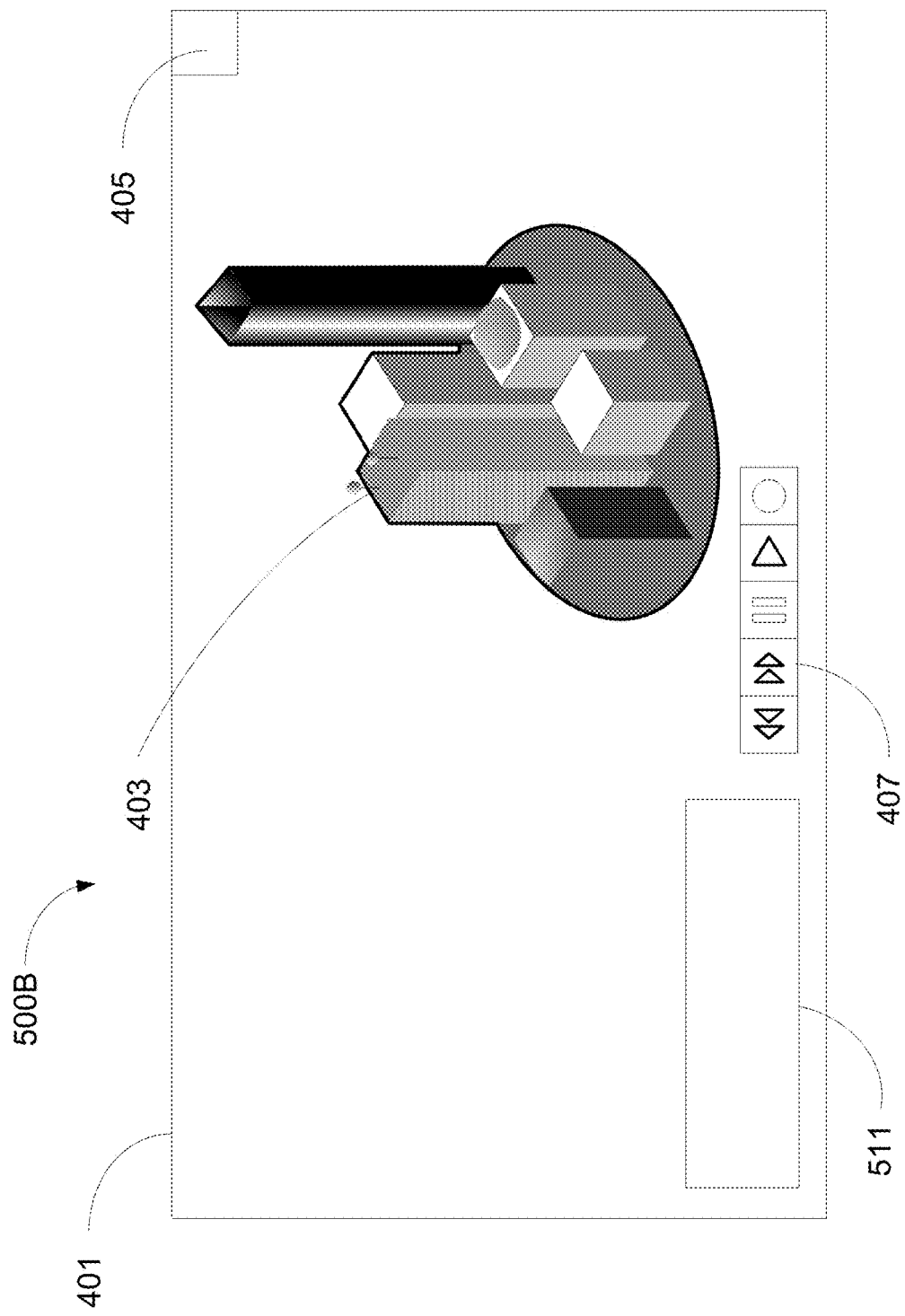
Figure 5C:
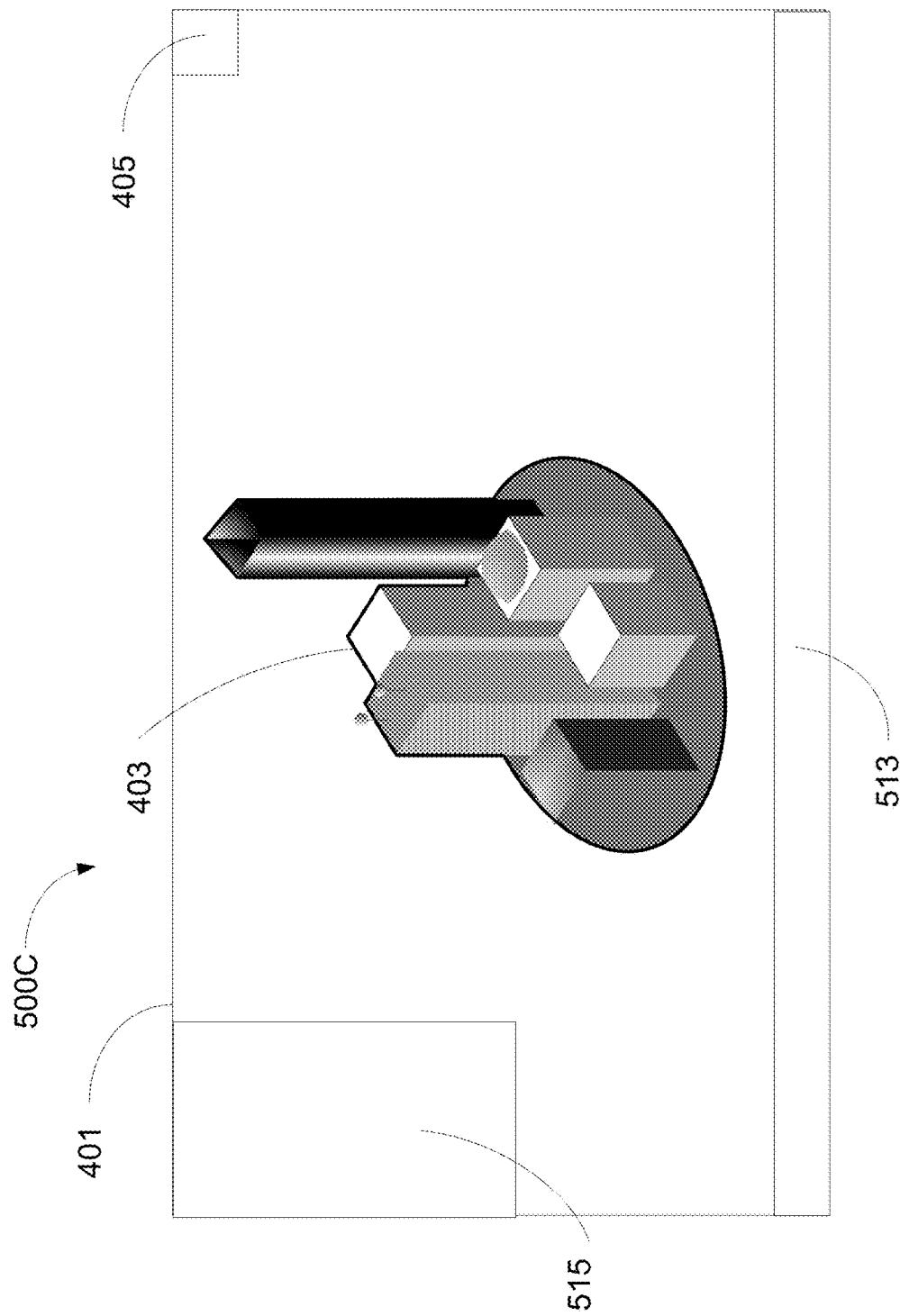

FIGS. 5A-5C illustrate examples of user interfaces for adjusting 3D video content in accordance with one or more features of the disclosure herein. FIG. 5A illustrates a user interface system 500A with a user interface 401 rendering 3D video content 403. In this example, one or more user accessible settings 509 may be rendered within user interface 401. FIG. 5A illustrates a single drop down box 509 user accessible setting. Such a drop down box 509 may be used by a viewer to identify the display capabilities and preferred mode of operation of the viewer. For example, drop down box 509 may include information as to the type of output device, e.g., a display capability, and an identification of a format, e.g., a preferred mode of operation, of over/under 3D video content rendering (e.g., horizontal or vertical separation of images). Other aspects of the image can be adjusted as well, such as the aspect ratio, scaling, size of video window (full screen, pixel dimensions, etc.), eyewear type being used, whether to view in 2D instead, an overall depth delta, etc. One type of setting may adjust the 3D depth of the image. For example, the user may determine how strong or weak the 3D effect should be, to control how close an image may appear to the face. The Z-axis of the image can be compressed to fit in a set maximum 3D range.

Any of a number of modes of operation and/or display capabilities may be included herein and/or utilized herein. Examples of illustrative modes of operation include a mode of operation for converting a 3D video content to 2D for viewing without a 3D display output device or without headgear for 3D viewing. One manner for such a conversion includes expanding one of the content for the left eye and right eye to be the only content displayed in a user interface 401. Another illustrative mode of operation includes a mode of operation for outputting an appropriate polarized display mode for use with 3D passive polarized headgear devices. Still another mode of operation is a mode of operation for outputting an appropriate display with 3D synchronization and signaling with active shutter headgear. Yet another illustrative mode of operation includes an auto-stereo mode of operation for outputting an appropriate display of content in 2D+ depth for headgear free 3D viewing. Still another illustrative mode of operation includes an anaglyph mode of operation for outputting an appropriate display of content for viewing 3D on a 2D display by using anaglyph headgear.

In accordance with aspects described herein, a network interface device or gateway may set display formats per the capability of the connected output device, such as a specific type of monitor or display device. Options for such formats include, but are not limited to, over/under, i.e., top/bottom, side by side full, alternative, i.e., interlaced, frame packing, i.e., a full resolution top/bottom format, checkerboard, line alternative full, side-by-side half, 2D+ depth. Since the gateway is upgradable by a new software and/or firmware version, additional formats may be utilized herein. With respect to the capability of the connected output device, the formatting may include a connection speed for the output device. As such, different 3D video content formatting may occur with respect to connection speeds based on some threshold. Example thresholds include a slow connection speed, an average connection speed, and a fast connection speed. Options for such connection speed formatting include, but are not limited to, store and forward, buffering, adaptive bit rate, and fragmented packet delivery.

Although shown as but one drop down box 509 in FIG. 5A, a plurality of different user accessible settings 509 may be rendered within a user interface 401. As such, a viewer may change a setting of a preferred mode of operation and/or display capability at any time. Therefore, if the viewer gets an upgrade to a different output device display and/or type of headgear for 3D video content viewing, the viewer can change the setting by accessing the one or more user accessible settings 509. In addition, the device outputting to the display may automatically determine the default mode of operation based upon recognition of the capabilities of the display and any headgear devices currently being utilized for 3D video content viewing.

FIG. 5B illustrates another example user interface system 500B where a captioning window 511 may be rendered within the user interface 401. Captioning window 511 may be a 2D window in front of the 3D video content 403. Alternatively, captioning may be rendered in 3D with adjustable depth in order to be in front of, within, or behind one or more areas of the 3D video content 403. A viewer may desire to have captioning be in a completely different 2D window where no overlap or blending with the 3D environment occurs. However, in other situations, a viewer may desire to have the captioning be included within the 3D video content 403. The ability to change the configuration of the rendering of the captioning may be identified as a request initiated by a user to change the appearance of the captioning.

FIG. 5C illustrates a user interface 500C with in band content object 513 and out of band content object 515 being rendered on a user interface 401 with 3D video content 403. In band content object 513 and/or out of band content object 515 may be rendered as 2D content in front of the 3D video content 403. Alternatively, in band content object 513 and/or out of band content object 515 may be rendered in 3D with adjustable depth in order to be in front of, within, or behind one or more areas of the 3D video content 403. A viewer may desire to have the in band content object 513 and/or the out of band content object 515 be in a completely different 2D window where no overlap or blending with the 3D environment occurs. However, in other situations, a viewer may desire to have the in band content object 513 and/or the out of band content object 515 be included within the 3D video content 403. The ability to change the configuration of the rendering of the in band content object and/or out of band content object may be identified as a request initiated by a user to change the appearance of the one and/or both.

In band content object 513 may be any in band content generated upstream from a local device of the viewer, and which may be a part of the video being streamed from an upstream source. In band content may be information and/or graphics associated with the 3D video content. For example, when watching a live sporting event, an in band content object 513 may be a banner displayed at the bottom of the user interface, such as 513, that includes the score of the event and remaining time. The 3D video content 403 may be the live sporting event itself. Out of band content object 515 may be any out of band content generated locally at a gateway, or received as part of a different stream from the video of the program, operatively connected to the display rendering the user interface 401, in the home of the viewer. For the same example of a sporting event, the viewer may be watching a live 3D football game. As such, the viewer may desire to render data from a website for a fantasy football league. As such, statistics and data for her fantasy football team may be displayed as out of band content object 515. The viewer may access the website for obtaining the needed data for rendering through a gateway at the home of the viewer. Both of the in band content object 513 and the out of band content object 515 may be adjusted in any manner including display of different data and display of data in a different size and/or location within the user interface 401. For example, in band object 513 and out of band object 515 may be within other places within user interface 401, including overlapping each other, whether the in band object 513 is in front of, within, or behind the out of band content 515.

Figure 6:
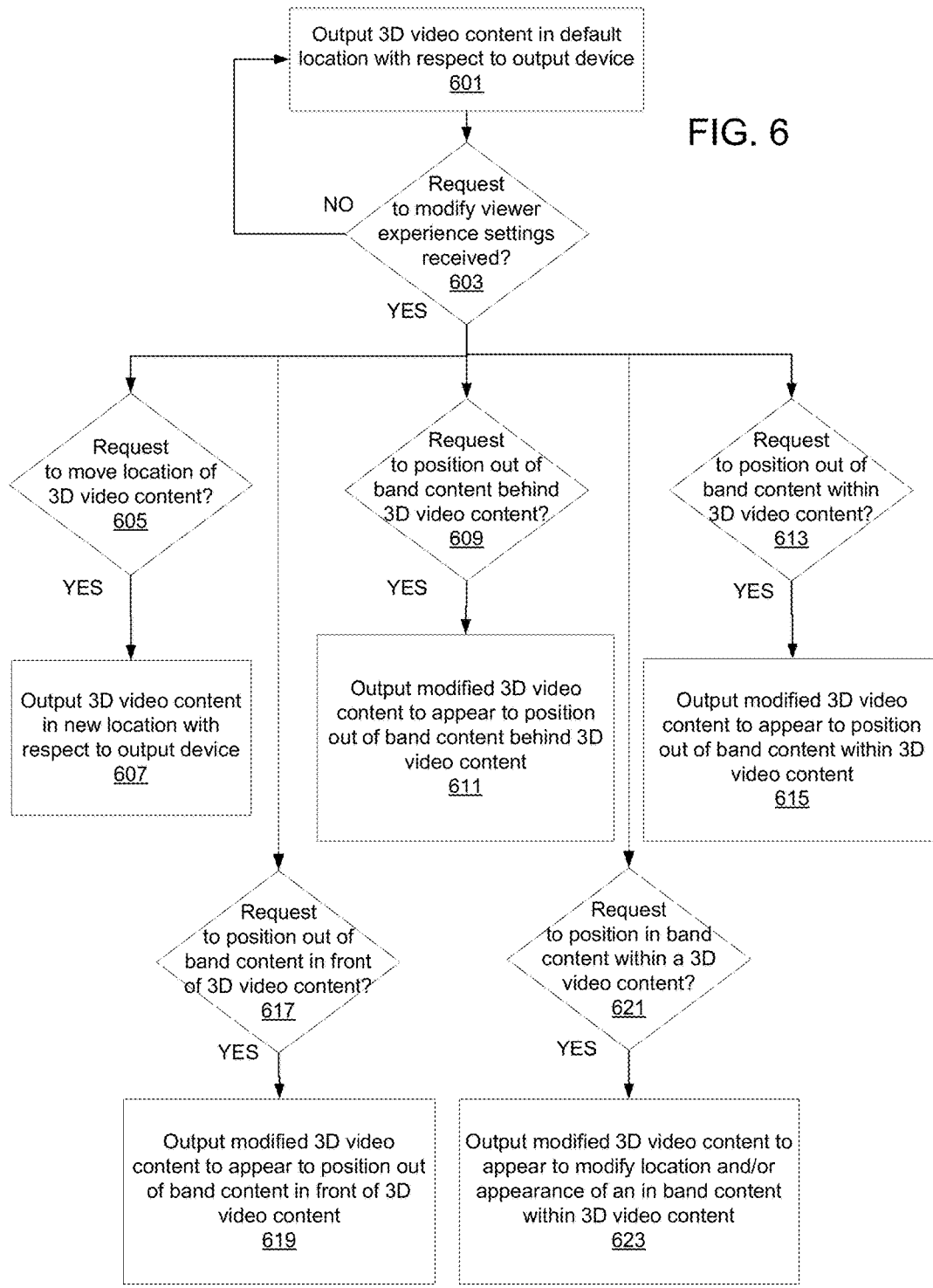
FIG. 6 is an illustrative flowchart of a method for modifying viewer experience settings in accordance with one or more features of the disclosure herein.

FIG. 6 is an illustrative flowchart of a method for modifying viewer experience settings in accordance with one or more features of the disclosure herein. The process starts and at 601, 3D video content may be outputted in a default location with respect to an output device. Such a situation may occur when a viewer first turns a monitor on for viewing 3D video content. By default, the 3D video content may be rendered in the entirety of the display of the monitor. Proceeding to 603, a determination may be made as to whether a request to modify one or more viewer experience settings has been received. If no, the process may return to 601 and continue to render 3D video content in a default location. In response to receipt of a request in 603, the system may determine the type of request to modify. If determined in 605 to be a request to move the location of the 3D video content from a first position to a second position within the display of the monitor, the process moves to 607 where the 3D video content is outputted in a new location with respect to the display of the monitor. If determined in 609 to be a request to position an out of band content object behind one or more images of the 3D video content, the process moves to 611 where the modified 3D video content is outputted in a new location with respect to the display of the monitor to appear to position the out of band content object behind the 3D video content.

Alternatively, if determined in 613 to be a request to position an out of band content object within one or more images of the 3D video content, the process moves to 615 where the modified 3D video content is outputted in a new location with respect to the display of the monitor to appear to position the out of band content object within the 3D video content. If determined in 617 to be a request to position an out of band content object in front of one or more images of the 3D video content, the process moves to 619 where the modified 3D video content is outputted in a new location with respect to the display of the monitor to appear to position the out of band content object in front of the 3D video content. Finally, if determined in 621 to be a request to position an in band content object within one or more images of the 3D video content, the process moves to 623 where the modified 3D video content is outputted in a new location with respect to the display of the monitor to appear to position the in band content object within the 3D video content. Although not shown, requests to position an in band content object in front of or behind the 3D video content may similarly be determined and responded to accordingly.

Figure 7:
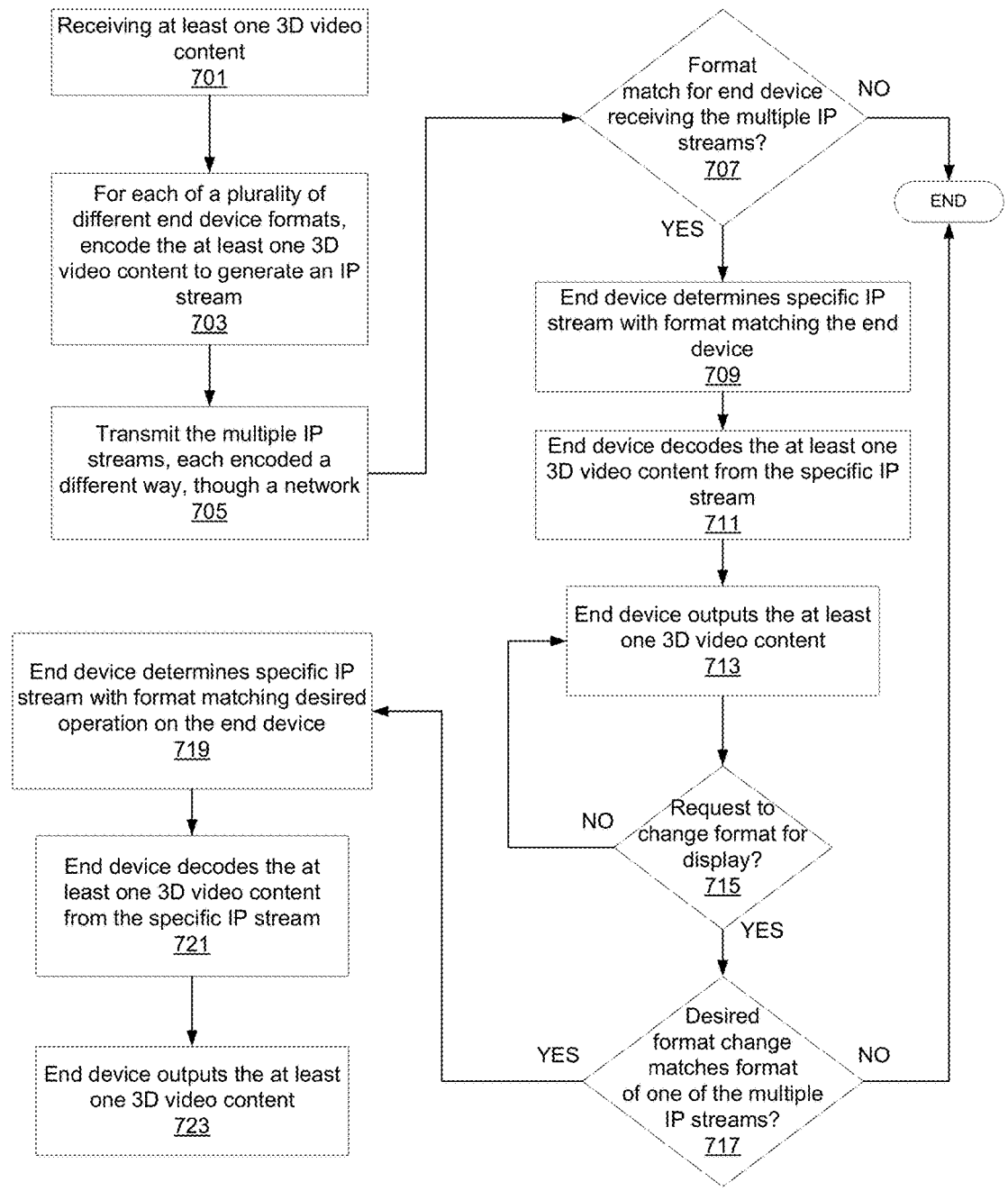
FIG. 7 is an illustrative flowchart of a method for transmitting multiple IP streams with encoded 3D content in accordance with one or more features of the disclosure herein.

FIG. 7 is an illustrative flowchart of a method for transmitting multiple IP streams with encoded 3D content in accordance with one or more features of the disclosure herein. The process starts and at 701, at least one 3D video content is received. The at least one 3D video content may include two separate video streams, one for the right eye and one for the left eye of a viewer, for example. In 703, the system may be aware of a plurality of end device formats, including connection speed of a viewer's home gateway and/or output device, which may be implemented. As such, the received 3D video content may be encoded to generate an IP stream. The received 3D video content may be encoded multiple times to generate multiple different IP streams with each IP stream including a different encoded 3D video stream for one of the plurality of different end device formats. For example, with respect to over/under formatting and side by side formatting, an IP stream of 3D video content encoded for the over/under formatting may be generated, and a different IP stream of the 3D video content encoded for side by side formatting may be generated.

In 705, the generated multiple IP streams may be transmitted through one or more networks for eventual receipt at an end device of a viewer. At 707, a determination may be made as to whether the format for operation of the end device of the viewer matches one of the received multiple IP streams. If not, the process may end or a message, such as an error message, may be sent to the viewer. If a match is found in 707, the process moves to 709 where the end device of the viewer determines the specific IP stream with formatting that matches the operation of the end device. In one example, the end device is a network interface device, such as gateway device 202 in FIGS. 2 and 3.

In 711, the end device may be configured to decode the 3D video content from the specific IP stream, and the 3D video content then may be displayed in 713 to a viewer through a display associated with end device. The 3D video content displayed in 713 may be based upon one or more environmental parameters associated with the output device. In one example, the end device may be a gateway and the gateway may be configured to detect the ambient light associated with the display of the output device (e.g., the device itself may include a light sensor, or may communicate with another light sensor in the home). The gateway may determine that the ambient light is very bright and output the 3D video content to the display of the output device responsively. For example, the gateway may lower the brightness level of the 3D video content for the display to account for the high ambient light associated with the display of the output device. It may do so by, for example, transmitting a wireless control signal to a light controller that is outfitted with a wireless transceiver and a processor to control light circuits in the home.

One use of such detection of ambient light and responsive display of 3D video content thereafter is for edge conflict correction. When a 3D image abuts an edge of a display of the 3D image, a conflict may be seen by the viewer creating fatigue in the viewing experience. Adaptation in a gateway may detect light and adjust edge tapering of the image on the screen so that the depth of the image at the edge of the screen is equal to that in the immediate vicinity of the display device. As such, edge fatigue is corrected in adjusting the 3D video content accordingly since the images displayed near the edge of the screen have the same depth as the surroundings in the home outside the edge of the monitor.

In 715, a determination may be made as to whether a request to change the format for display has been received. Such a request may include a viewer accessing drop down box 509 in FIG. 5A as described above. If not, the process may return to 713. Else, if a request is received in 715, a determination may be made in 717 as to whether the request for a desired change in formatting, that may correlate to a change in operation, matches one of the received multiple IP streams. If not, the process may end or a message, such as an error message, may be sent to the viewer. If a match is found in 717, the process moves to 719 where the end device of the viewer determines the specific IP streams with formatting that matches the desired mode of operation of the end device. In 721, the end device may be configured to decode the 3D video content from the specific IP stream determined in 719, and the 3D video content then may be displayed to a viewer in accordance with the desired formatting through a display associated with end device in 723.

Figure 8:
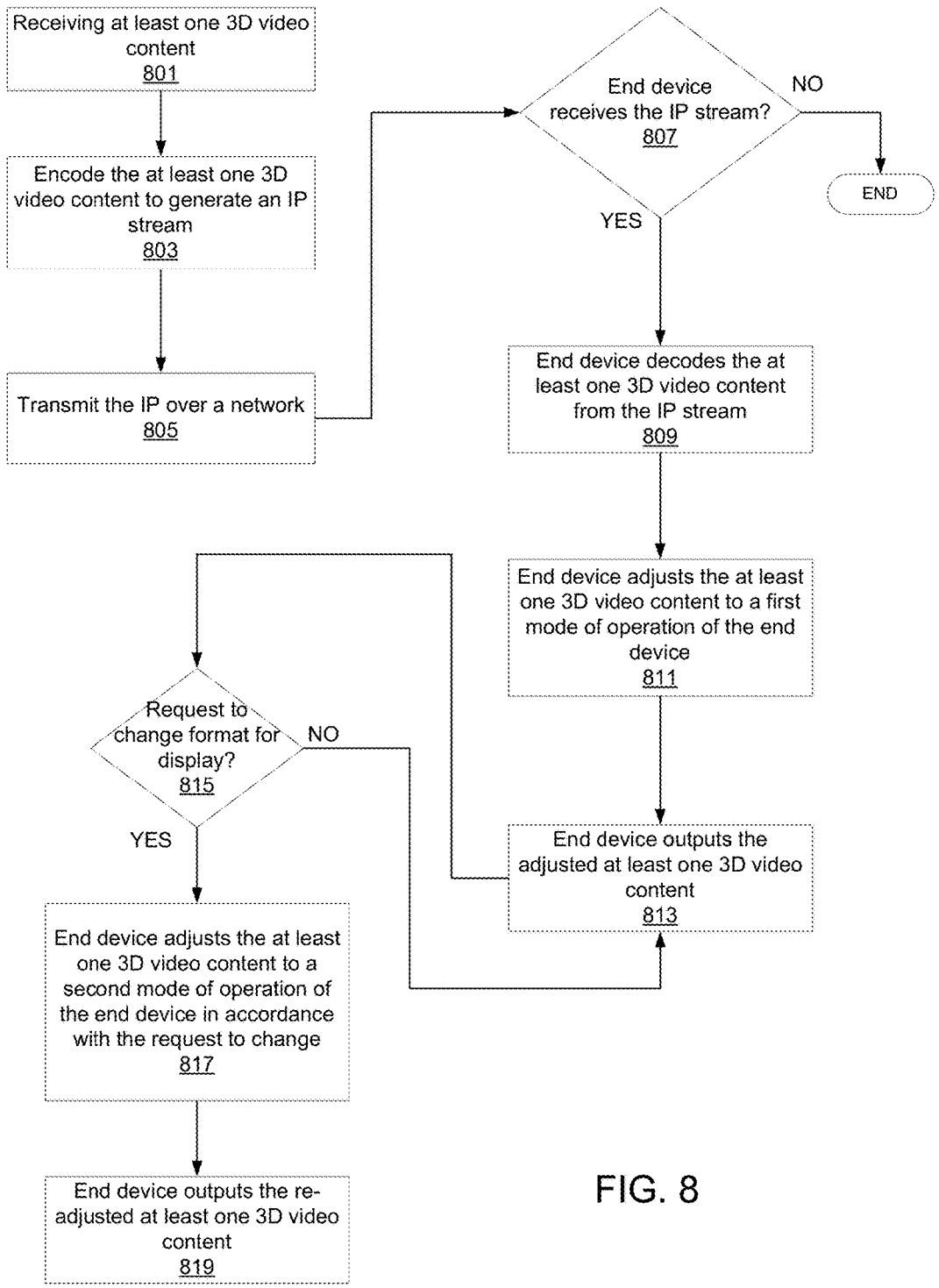
FIG. 8 is an illustrative flowchart of a method for adjusting 3D content associated with an IP stream in accordance with one or more features of the disclosure herein.

FIG. 8 is an illustrative flowchart of a method for adjusting 3D content associated with an IP stream in accordance with one or more features of the disclosure herein. The process starts and at 801, at least one 3D video content is received. The at least one 3D video content may include two separate video streams, one for the right eye and one for the left eye of a viewer, for example. In 803, the received 3D video content may be encoded to generate an IP stream. In 805, the generated IP stream may be transmitted over one or more networks for eventual receipt at an end device of a viewer.

At 807, a determination may be made as to whether the end device of the viewer receives the transmitted IP stream. If not, the process may end or a message, such as an error message, may be sent to the viewer. If a match is found in 807, the process moves to 809 where the end device of the viewer may be configured to decode the 3D video content from the IP stream. In 811, the 3D video content may be adjusted to a first mode of operation of the end device. For example, the end device may be a gateway as described herein that is configured to adjust received 3D video content received encoded within an IP stream to be rendered on a display of the end device. The adjusted 3D video content then may be displayed in 813 to a viewer through a display associated with the end device.

In 815, a determination may be made as to whether a request to change the format for display has been received. Such a request may include a viewer accessing drop down box 509 in FIG. 5A as described above. If not, the process may return to 813. Else, if a request is received in 815, the adjusted 3D video content may be adjusted in 817 to a second mode of operation of the end device in accordance with the request to change received in 815. The re-adjusted 3D video content then may be displayed in 819 to a viewer through a display associated with the end device.

Other embodiments include numerous variations on the devices and techniques described above. Embodiments of the disclosure include a machine readable storage medium (e.g., a CD-ROM, CD-RW, DVD, floppy disc, FLASH memory, RAM, ROM, magnetic platters of a hard drive, etc.) storing machine readable instructions that, when executed by one or more processors, cause one or more devices to carry out operations such as are described herein.

The foregoing description of embodiments has been presented for purposes of illustration and description. The foregoing description is not intended to be exhaustive or to limit embodiments of the present disclosure to the precise form disclosed, and modifications and variations are possible in light of the above teachings or may be acquired from practice of various embodiments. Additional embodiments may not perform all operations, have all features, or possess all advantages described above. The embodiments discussed herein were chosen and described in order to explain the principles and the nature of various embodiments and their practical application to enable one skilled in the art to utilize the present disclosure in various embodiments and with various modifications as are suited to the particular use contemplated. The features of the embodiments described herein may be combined in all possible combinations of methods, apparatuses, modules, systems, and machine-readable storage media. Any and all permutations of features from above-described embodiments are the within the scope of the disclosure.

The invention claimed is:

1. A method comprising:
   determining a first Internet protocol (IP) stream, of a plurality of IP streams, based upon a first mode of operation of an output device;
   decoding first 3D video content in the first IP stream;
   outputting the first 3D video content for display on the output device;
   receiving a user request to adjust the first 3D video content;
   determining a second IP stream, of the plurality of IP streams, based upon a second mode of operation of the output device and the received user request;
   decoding second 3D video content in the second IP stream, the second 3D video content being an adjusted version of the first 3D video content; and
   outputting the second 3D video content for display on the output device.

2. The method of claim 1, wherein the first mode of operation and second mode of operation of the output device are configurations for outputting 3D video content.

3. The method of claim 1, wherein the first mode of operation of the output device is based upon a type of 3D video content viewing headgear associated with the output device.

4. The method of claim 1, wherein the user request to adjust the first 3D video content is a request to convert the first 3D video content to 2D video content and the second 3D video content represents the first 3D video content converted to 2D.

5. The method of claim 1, wherein the second 3D video content comprises captioning.

6. The method of claim 5, further comprising outputting the captioning for display on the output device in a 2D window.

7. The method of claim 5, further comprising positioning the captioning in front of the second 3D video content.

8. One or more non-transitory computer readable media storing computer-executable instructions that, when executed by at least one processor, causes the at least one processor to perform a method of:
   determining a first Internet protocol (IP) stream, of a plurality of IP streams, based upon a first mode of operation of an output device;
   decoding first 3D video content in the first IP stream;
   outputting the first 3D video content for display on the output device;
   receiving a user request to adjust the first 3D video content;
   determining a second IP stream, of the plurality of IP streams, based upon a second mode of operation of the output device and the received user request;
   decoding second 3D video content in the second IP stream, the second 3D video content being an adjusted version of the first 3D video content; and
   outputting the second 3D video content for display on the output device.

9. The one or more non-transitory computer readable media of claim 8, wherein the first mode of operation and the second mode of operation of the output device are configurations for outputting 3D video content.

10. The one or more non-transitory computer readable media of claim 8, wherein the first mode of operation of the output device is based upon a type of 3D video content viewable headgear associated with the output device.

11. The one or more non-transitory computer readable media of claim 8, wherein the user request to adjust the first 3D video content is a request to convert the first 3D video content to 2D video content and the second 3D video content represents the first 3D video content converted to 2D.

12. The one or more non-transitory computer readable media of claim 8, wherein the second 3D video content comprises captioning.

13. The one or more non-transitory computer readable media of claim 12, wherein the computer-executable instructions further cause the at least one processor to perform outputting the captioning for display on the output device in a 2D window.

14. A method comprising:
   determining, based upon a first mode of operation of an output device, a first Internet protocol (IP) stream of a plurality of IP streams;
   decoding first 3D video content in the first IP stream;
   outputting the first 3D video content to the output device;
   receiving a user request to adjust the first 3D video content;
   determining, based upon the user request, a second IP stream of the plurality of IP streams;
   decoding second 3D video content in the second IP stream, the second 3D video content being an adjusted version of the first 3D video content; and
   outputting the second 3D video content to the output device.

15. The method of claim 14, further comprising determining the first mode of operation of the output device based upon capabilities of the output device.

16. The method of claim 14, wherein the second 3D video content comprises the first 3D video content converted to 2D video content.

17. A method comprising:
   determining a first Internet protocol (IP) stream, of a plurality of IP streams, from which to decode first 3D video content based upon a first mode of operation of an output device;
   outputting the first 3D video content to the output device;
   receiving a user request to adjust the first 3D video content;
   determining, in response to the received user request, a second IP stream, of the plurality of IP streams, from which to decode second 3D video content based upon a second mode of operation of the output device, wherein the second mode of operation is an auto-stereo mode of operation; and
   outputting the second 3D video content to the output device, wherein the second 3D video content is the first 3D video content adjusted to a 2D+depth.

18. The method of claim 17, further comprising determining the first mode of operation and the second mode of operation of the output device based upon capabilities of the output device.

19. The method of claim 14, wherein determining, based upon the user request, the second IP stream of the plurality of IP streams comprises selecting an IP stream corresponding to the user request in the plurality of IP streams.

20. The method of claim 1, wherein the first mode of operation or the second mode of operation comprises a mode of operation for converting a 3D video content to 2D, a mode of operation for outputting a polarized display, a mode of operation for outputting a display with 3D synchronization and signaling for an active shutter headgear, a mode of operation for outputting a display of content in 2D+depth, or an anaglyph mode of operation.

\* \* \* \* \*

UNITED STATES PATENT AND TRADEMARK OFFICE
CERTIFICATE OF CORRECTION

PATENT NO. : 9,813,754 B2  Page 1 of 1
APPLICATION NO. : 13/613262
DATED : November 7, 2017
INVENTOR(S) : Mark David Francisco It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 22 days.

Signed and Sealed this
Twenty-fifth Day of September, 2018

Andrei Iancu
*Director of the United States Patent and Trademark Office*

UNITED STATES PATENT AND TRADEMARK OFFICE
CERTIFICATE OF CORRECTION

PATENT NO. : 9,813,754 B2  
APPLICATION NO. : 13/613262  
DATED : November 7, 2017  
INVENTOR(S) : Mark David Francisco Page 1 of 1

It is certified that error appears in the above-identified patent and that said Letters Patent is hereby corrected as shown below:

In the Specification

Column 6, Detailed Description, Line 24:  
Please delete "DOC SIS" and insert --DOCSIS--

In the Claims

Column 14, Claim 17, Line 53:  
Delete "2D+depth." and insert --2D+ depth.--

Column 15, Claim 20, Line 1:  
Delete "2D+depth," and insert --2D+ depth,--

Signed and Sealed this  
Sixth Day of September, 2022

Katherine Kelly Vidal  
*Director of the United States Patent and Trademark Office*